(12) United States Patent
Kim et al.

(10) Patent No.: US 7,630,602 B2
(45) Date of Patent: Dec. 8, 2009

(54) OPTICAL FILTER MODULE AND METHOD OF MANUFACTURING THE SAME

(75) Inventors: Duk Jun Kim, Daejeon (KR); Jong Moo Lee, Daejeon (KR); Junghyung Pyo, Seoul (KR); Gyungock Kim, Seoul (KR)

(73) Assignee: Electronics and Telecommunications Research Institute, Daejeon-City (KR)

( * ) Notice: Subject to any disclaimer, the term of this patent is extended or adjusted under 35 U.S.C. 154(b) by 0 days.

(21) Appl. No.: 11/856,498

(22) Filed: Sep. 17, 2007

(65) Prior Publication Data
US 2008/0131054 A1 Jun. 5, 2008

(30) Foreign Application Priority Data
Dec. 4, 2006 (KR) ............... 10-2006-0121818
Mar. 28, 2007 (KR) ............... 10-2007-0030355

(51) Int. Cl.
G02B 6/34 (2006.01)
G02B 6/10 (2006.01)

(52) U.S. Cl. ............... 385/37; 385/31; 385/32; 385/39; 385/43; 385/46; 385/129; 385/130; 385/131; 385/132

(58) Field of Classification Search ............... 385/37
See application file for complete search history.

(56) References Cited

U.S. PATENT DOCUMENTS 6,118,909 A * 9/2000 Chen et al. ............... 385/15

(Continued)

FOREIGN PATENT DOCUMENTS

JP 10-307219 11/1998

(Continued)

OTHER PUBLICATIONS

English machine translation of JP 2004-170627.*

(Continued)

*Primary Examiner*—Ryan Lepisto
(74) *Attorney, Agent, or Firm*—Rabin & Berdo, P.C.

(57) ABSTRACT

An optical filter module for wavelength multiplexing and demultiplexing and a method of manufacturing the same are provided. The optical filter module for wavelength multiplexing and demultiplexing includes: at least one or more input waveguides; an input-stage star coupler in the form of a slab waveguide connected to the input waveguides; array waveguide which is connected to the input-stage star coupler and in which a plurality of individual waveguides, each of which has an optical path having a predetermined length different to those of the other waveguides and has a heterogeneous waveguide interval formed of a material having a different refraction index from that of a core of the waveguides, are sequentially arranged; an output-stage star coupler in the form of a slab waveguide connected to the array waveguides; and at least one or more output waveguides connected to the output-stage star coupler. According to the optical filter module and the method of manufacturing the same, heterogeneous waveguide intervals having core materials different from those of conventional waveguides are introduced in predetermined areas of array waveguides, thereby reducing polarized light and temperature dependency and at the same time effectively removing optical coupling loss, which can occur at both ends of a heterogeneous waveguide interval, without an additional process of forming waveguides.

7 Claims, 3 Drawing Sheets

U.S. PATENT DOCUMENTS

| | | | |
|---|---|---|---|
| 6,373,872 B2 * | 4/2002 | Deacon ........................ | 372/34 |
| 6,636,662 B1 * | 10/2003 | Thompson et al. ............ | 385/27 |
| 6,865,304 B1 * | 3/2005 | Ticknor ........................ | 385/11 |
| 6,925,231 B2 * | 8/2005 | Lazaro Villa et al. .......... | 385/37 |
| 7,016,589 B2 * | 3/2006 | Mendoza et al. ............. | 385/132 |
| 7,072,545 B2 * | 7/2006 | Nara et al. .................... | 385/37 |
| 7,130,518 B2 * | 10/2006 | Yamazaki .................... | 385/129 |
| 7,133,587 B2 * | 11/2006 | Nara et al. .................... | 385/37 |
| 7,228,043 B2 * | 6/2007 | Shimoda ...................... | 385/131 |
| 7,248,765 B2 * | 7/2007 | Lee et al. ...................... | 385/37 |
| 2002/0118916 A1 | 8/2002 | Lee et al. | |
| 2004/0057667 A1 | 3/2004 | Yamada et al. | |
| 2005/0100300 A1 * | 5/2005 | Joyner et al. ................ | 385/129 |
| 2005/0123244 A1 | 6/2005 | Block et al. | |

FOREIGN PATENT DOCUMENTS

| | | | |
|---|---|---|---|
| JP | 2004-170627 | * | 6/2004 |
| JP | 2005-128419 | | 5/2005 |
| KR | 10-2005-0036403 | | 4/2005 |
| KR | 20050114913 | | 12/2005 |

OTHER PUBLICATIONS

H. Tanobe, et al., "Temperature Insensitive Arrayed Waveguide Gratings on InP Substrates" IEEE Photonics Technology Letters, Vo. 10, No. 2, Feb. 1998, pp. 235-237.

C. Nadler, et al., "Polarization Insensitive, Low-Loss, Low-Crosstalk Wavelength Multiplexer Modules" IEEE Journal of Selected Topics in Quantum Electronics, vol. 5, No. 5, Sep./Oct. 1999, pp. 1407-1412.

D. Kim, et al., "Suppression of Temperature and Polarization Dependence by Polymer Overcladding in Silica-Based AWG Multiplexer" Monday Afternoon, OFC 2003, vol. 1, pp. 61-62.

Foreign Office Action with No. 10-2007-0030355, no translation provided.

* cited by examiner

OPTICAL FILTER MODULE AND METHOD OF MANUFACTURING THE SAME

CROSS-REFERENCE TO RELATED PATENT APPLICATIONS

This application claims the benefit of Korean Patent Application No. 10-2006-0121818, filed on Dec. 4, 2006 and Korean Patent Application No. 10-2007-0030355, filed on Mar. 28, 2007 in the Korean Intellectual Property Office, the disclosures of which are incorporated herein in their entirety by reference.

BACKGROUND OF THE INVENTION

1. Field of the Invention

The present invention relates to an optical filter module for wavelength multiplexing and demultiplexing and a method of manufacturing the same, and more particularly, to an optical filter module for wavelength multiplexing and demultiplexing in the form of an arrayed waveguide grating which is used in an optical communication system using a wavelength division multiplexing method, and a method of manufacturing the same.

2. Description of the Related Art

FIG. 1 is a diagram illustrating an example of a conventional optical filter module for wavelength multiplexing and demultiplexing in the form of an arrayed waveguide grating.

Referring to FIG. 1, signal lights which are wavelength-multiplexed through an input waveguide 101 are optically coupled with an input-stage star coupler 102 in the form of a slab waveguide. Then, the signal lights further propagate and are then coupled with array waveguides 103.

Individual waveguides forming the array-waveguide 103 are sequentially arranged so that the optical path of each waveguide has a predetermined length different from that of the other waveguides. Signal lights propagating through respective individual waveguides are optically coupled with an output-stage star coupler 104 in the form of a slab waveguide. Then, the signal lights further propagate and are then optically coupled with output waveguides 105.

Through a series of these processes, the wavelength-multiplexed signal lights input through the input waveguide 101 are separated in terms of wavelengths and output through respective output waveguides 105.

When the signal lights, each of which has a wavelength corresponding to one of the output waveguides 105, are input to the output waveguides 105, the wavelength-multiplexed signal lights are output in a collected form through the input waveguide 101. Accordingly, when the signal lights are input to the output waveguides 105, the optical filter module performs a wavelength-multiplexing function.

In order to achieve a good performance of the optical filter module, it is necessary to minimize the loss of optical power of the signal light which is accumulated in a plurality of continuous optical coupling and propagation processes, as described above, and the phase error of the signal light which is accumulated when the signal process propagates through the array-waveguide 103. Thus, an optical filter module that minimizes the loss of optical power of signal light and a phase error of the signal light, is required.

SUMMARY OF THE INVENTION

The present invention provides an optical filter module and a method of manufacturing the same, in which heterogeneous waveguide intervals having core materials having refractive indices different from those of conventional waveguides are introduced in predetermined areas of array waveguides, thereby reducing the polarized light and temperature dependency and at the same time effectively reducing optical coupling loss, which can occur at both ends of a heterogeneous waveguide interval, without an additional process of forming waveguides.

According to an aspect of the present invention, there is provided an optical filter module for wavelength multiplexing and demultiplexing, the module including: at least one input waveguide; an input-stage star coupler in the form of a slab waveguide connected to the input waveguides; an array waveguide which is connected to the input-stage star coupler and in which a plurality of individual waveguides, each of which has an optical path having a predetermined length different to those of the other waveguides and has a homogeneous waveguide interval formed of a core material having a first refractive index and a heterogeneous waveguide interval formed of core materials having the first refractive index and a second refractive index that is greater or less than the first refractive index, are sequentially arranged; an output-stage star coupler in the form of a slab waveguide connected to the array waveguides; and at least one output waveguide connected to the output-stage star coupler. In the heterogeneous waveguide interval, a core material having a lesser refractive index is the clad of a core having a greater refractive index. The optical path lengths of individual waveguides are different from each other in the homogeneous waveguide interval and the heterogeneous waveguide interval, respectively.

Each individual waveguide may include: a homogeneous waveguide interval formed of a core material having a first refractive index; and a heterogeneous waveguide interval in which core materials have the first refractive index and a second refractive index that is greater or less than the first refractive index and material of core having a lesser refractive index is the clad of a core having a greater refractive index; and a transitional waveguide interval formed of core materials having the first refractive index and the second refractive index, which is connected between the homogeneous waveguide interval and the heterogeneous waveguide interval, and in which the width of the core having the second refractive index gradually decreases in the direction from the heterogeneous waveguide interval to the homogeneous waveguide interval if the second refractive index is greater than the first refractive index, but if the first refractive index is greater than the second refractive index, the width of the core having the first refractive index gradually decreases in the direction from the homogeneous waveguide interval to the heterogeneous waveguide interval.

According to another aspect of the present invention, there are provided array waveguides in which a plurality of individual waveguides, each of which has an optical path with a length different from those of the other waveguides, are sequentially arranged, wherein each individual waveguide has a homogeneous waveguide interval formed of a core material having a first refractive index and a heterogeneous waveguide interval formed of core materials having the first refractive index and a second refractive index that is greater or less than the first refractive index, and in the heterogeneous waveguide interval, a core material having a lesser refractive index is the clad of a core having a greater refractive index. The optical path lengths of individual waveguides are different from each other in the homogeneous waveguide interval and the heterogeneous waveguide interval, respectively.

Each individual waveguide may include: a homogeneous waveguide interval formed of a core material having a first refractive index; and a heterogeneous waveguide interval in which core materials have the first refractive index and a second refractive index that is greater or less than the first refractive index and a core material having a lesser refractive index is the clad of a core having a greater refractive index; and a transitional waveguide interval formed of core materials having the first refractive index and the second refractive index, which is connected between the homogeneous waveguide interval and the heterogeneous waveguide interval, and in which the width of the core having the second refractive index gradually decreases in the direction from the heterogeneous waveguide interval to the homogeneous waveguide interval if the second refractive index is greater than the first refractive index, but if the first refractive index is greater than the second refractive index, the width of the core having the first refractive index gradually decreases in the direction from the homogeneous waveguide interval to the heterogeneous waveguide interval.

According to another aspect of the present invention, there is provided a method of manufacturing an optical filter module for wavelength multiplexing and demultiplexing, the method including: forming at least one input waveguide; connecting an input-stage star coupler in the form of a slab waveguide to the input waveguides; forming array waveguides, by sequentially arranging a plurality of individual waveguides each of which has an optical path having a predetermined length different from the other waveguides and has a homogeneous waveguide interval formed of a core material having a first refractive index and a heterogeneous waveguide interval formed core materials having the first refractive index and a second refractive index that is greater or less than the first refractive index, and connecting the array waveguides to the input-stage star coupler; connecting an output-stage star coupler in the form of a slab waveguide the array waveguides; and connecting one or more output waveguides to the output-stage star coupler. The heterogeneous waveguide interval includes a core material having a lesser refractive index as the clad of a core having a greater refractive index. The optical path lengths of individual waveguides are different from each other in the homogeneous waveguide interval and the heterogeneous waveguide interval, respectively.

The forming of the array waveguides and the connecting of the array waveguides to the input-stage star coupler may include: forming a homogeneous waveguide interval with a core material having a first refractive index; forming a heterogeneous waveguide interval in which core materials have the first refractive index and a second refractive index that is greater or less than the first refractive index and in the heterogeneous waveguide interval, forming a core material having a lesser refractive index as the clad of a core having a greater refractive index; and forming a transitional waveguide interval with core materials having the first refractive index and the second refractive index, in which the width of the core having the second refractive index gradually decreases in the direction from the heterogeneous waveguide interval to the homogeneous waveguide interval if the second refractive index is greater than the first refractive index, but if the first refractive index is greater than the second refractive index, the width of the core having the first refractive index gradually decreases in the direction from the homogeneous waveguide interval to the heterogeneous waveguide interval, and connecting the transitional waveguide interval between the homogeneous waveguide interval and the heterogeneous waveguide interval.

According to another aspect of the present invention, there is provided a method of manufacturing array waveguide in which a plurality of individual waveguides, each of which has an optical path with a length different from that of the other waveguides and has a homogeneous waveguide interval, a heterogeneous waveguide interval and a transitional waveguide interval, are sequentially arranged, the method including: forming the homogeneous waveguide interval with a core material having a first refractive index, in each individual waveguide; forming the heterogeneous waveguide interval with core materials having the first refractive index and a second refractive index that is greater or less than the first refractive index, in each individual waveguide, and in the heterogeneous waveguide interval, forming a core material having a lesser refractive index as the clad of a core having a greater refractive index; and forming the transitional waveguide interval in which the width of the core having the second refractive index gradually decreases in the direction from the heterogeneous waveguide interval to the homogeneous waveguide interval if the second refractive index is greater than the first refractive index, but if the first refractive index is greater than the second refractive index, the width of the core having the first refractive index gradually decreases in the direction from the homogeneous waveguide interval to the heterogeneous waveguide interval, and connecting the transitional waveguide interval between the homogeneous waveguide interval and the heterogeneous waveguide interval, The optical path lengths of individual waveguides are different from each other in the homogeneous waveguide interval and the heterogeneous waveguide interval, respectively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

An optical filter module and a method of manufacturing the same according to the present invention will now be described more fully with reference to the accompanying drawings, in which exemplary embodiments of the invention are shown.

Figure 2:
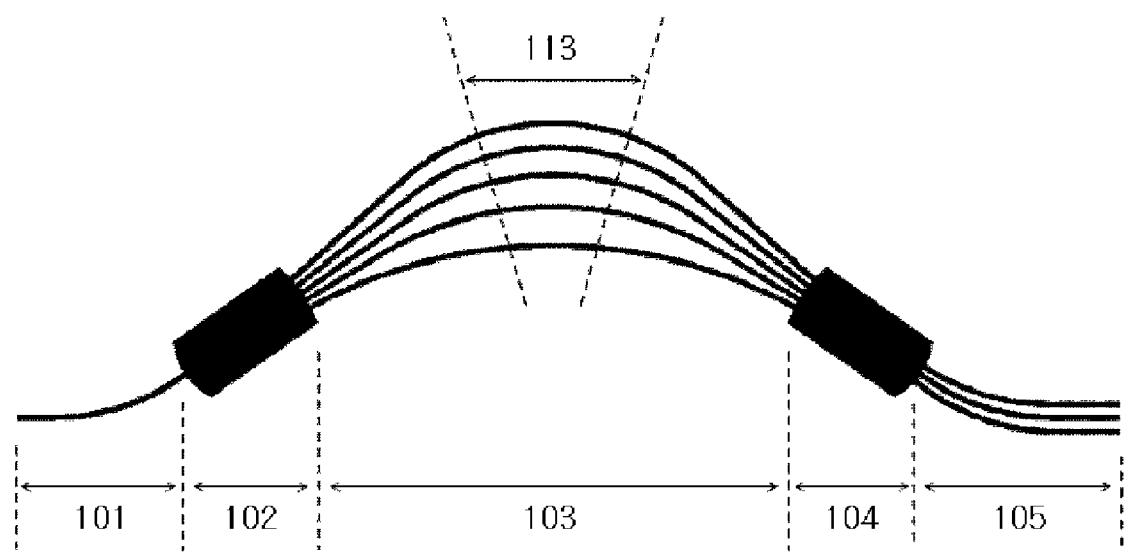
FIG. 2 is a diagram illustrating another example of a conventional optical filter module for wavelength multiplexing and demultiplexing in the form of an arrayed waveguide grating including heterogeneous waveguide intervals.

FIG. 2 is a diagram illustrating an example of a conventional optical filter module for wavelength multiplexing and demultiplexing in the form of an arrayed waveguide grating in which heterogeneous waveguide intervals are introduced.

Among the suggested methods, a technology for designing an arrayed waveguide grating by introducing heterogeneous waveguide intervals 113 having different characteristics of guided wave, inside the array waveguide 103 as illustrated in FIG. 2 (for example, an optical waveguide-type filter and a method of manufacturing the same disclosed in Japanese Patent Laid-open No. 1998-307219) can integrate a variety of optical devices performing different functions on an identical substrate.

Also, the heterogeneous waveguide intervals 113 may be sequentially arranged so that the optical path of each waveguide has a predetermined interval different to that of the others. Grooves for internal stress relief may be formed on a side clad part of a heterogeneous waveguide (C. K. Nadler et al, IEEE Journal of Selected Topics in Quantum Electronics, Vol. 5, No. 5, p. 1407-1412 (1999), or a thermal optical coefficient of a heterogeneous waveguide may be changed (for example, a thermal optical device disclosed in U.S. Pat. No. 6,118,909), thereby reducing polarized light and temperature dependency of an optical filter module.

The thermal optical coefficient of a waveguide refers to a measure of how an effective refractive index of a basic mode of the waveguide changes with respect to temperature. The sign and magnitude of the thermal optical coefficient of the waveguide is determined mostly by the thermal optical coefficient of a waveguide core material used to form the waveguide.

However, when the refractive index difference between a core material and a clad material is small, or when the sectional area of a core is small and therefore the degree of concentration on the inside of the core, of the electromagnetic field of a guided wave is small, the absolute value of the thermal optical coefficient of a waveguide mode can be lowered by using a material having a thermal optical coefficient with a sign opposite to that of the core material and having a large absolute value, as the clad. In some special cases, the sign of the thermal optical coefficient of the waveguide mode may be inverted.

This phenomenon can occur when a material having a positive thermal optical coefficient, such as inorganic silica, is used as a core and a material having a negative thermal optical coefficient, such as an organic polymer, is used as a clad. There have been attempts to reduce temperature dependency of an optical filter module, by introducing this hybrid-type waveguide into part or whole of array waveguide such as the array waveguide 103 (Kim, Duk-Jun et al, Optical Fiber Communications Conference 2003, vol. 1, pp. 61-62 (2003) and Korean Patent No. 10-0597232).

The method using the organic polymer as a clad has an advantage in that the method can be easily implemented because of a relatively simple process of forming a waveguide. However, the method has a drawback in that the temperature of a following process cannot be raised sufficiently because of a low pyrolysis temperature of the organic polymer.

For this reason, a material that can withstand high temperatures unlike organic polymers and has a negative thermal optical coefficient is required. However, in reality it is difficult to find this kind of material. However, if a waveguide in which the difference of the thermal optical coefficient in a core material itself is relatively large is applied to the heterogeneous waveguide intervals 113, it is theoretically possible to remove the temperature dependency of an optical filter even in a situation where both the thermal optical coefficients of the core material and the clad material are positive.

However, the reduction of temperature dependency using the thermal optical coefficient difference of a core material itself as described above has been implemented only in a waveguide in the form of a rib structure in which compositions of InGaAsP, which is a slab material, are 1.1Q and 1.3Q and different from each other, but ribs existing on the top part are identically 1.1Q as H. Tanobe and others have suggested (H. Tanobe et al, IEEE Photonics Technology Letters, Vol. 10, No. 2, pp. 235-237 (1998)). In a channel or embedded waveguide in which a whole core is surrounded by a clad, it is actually difficult to implement the method because of the complicated process of forming the waveguide.

Meanwhile, according to a manufacturing process, an optical filter module is implemented by forming optical waveguides on the top part of a substrate formed of a material such as silicon or glass. The greater the difference between the refractive indices of the core material and the clad material of the waveguide, the smaller the radius of curvature of a curved waveguide can be designed. Accordingly, the core material and the clad material of the waveguide can be chosen such that the difference between the refractive indices of the core material and the clad material is relatively large in order to reduce the size of optical devices such as the optical filter module and to improve integration.

Though a greater difference between the refractive indices is desirable like this, there is a tendency that guided wave loss of a manufactured waveguide rapidly increases with the increasing difference between the refractive indices of the core material and the clad material.

The greater the difference between the refractive indices of the core material and the clad material of the waveguide, the smaller the sectional area of the waveguide core satisfying a single mode condition becomes. In this case, the physical coarseness of a core side surface caused by an etching process is known to greatly contribute to the increase in loss of guided wave.

This increase in coarseness causes an increase in the phase error between individual waveguides as well as an increase in the light loss of the array waveguides themselves in an optical filter module in a form of an arrayed waveguide grating. Also, ultimately, a problem of serious deterioration of the optical crosstalk characteristic of the optical filter module occurs.

Meanwhile, when the refractive index difference between two materials used as a core and a clad, for example, silicon and silica, respectively, of a channel or embedded type single mode waveguide, is equal to or greater than 2, it is preferred that the cross-sectional shape of the core has a rectangular shape with a thickness of about 220 nm and a width of about 500 nm rather than a square shape having sides of 300 nm.

The technique to extend the width relative to the thickness of the core can suppress the increase of the light loss caused by the side coarseness, but becomes a major reason for a relatively large difference between effective refraction indices of waveguides in a TE mode and a TM mode.

Also, since the wavelength of a filter is determined directly by the effective refractive indices of waveguides forming array-waveguide, the polarized light dependency of a filter wavelength in an optical filter module in a form of an arrayed waveguide grating implemented by silicon waveguides with a rectangular shape becomes a serious problem.

Thus, the method of changing the optical characteristic of waveguides in predetermined areas of the array waveguide 103 in the optical filter module in the form of an arrayed waveguide grating is desirable for single integration of a variety of optical devices performing different functions, as well as for a design for reducing polarized light and temperature dependency of an optical filter module.

Also, the method of changing the clad material only in predetermined areas of the array waveguide is easy to implement in the aspect of the process of forming a waveguide, but when the concentration of the energy of a guided wave on the core is considered, changing the core material itself is more advantageous in the aspect of effective suppression of polarization and temperature dependency.

However, when a channel or embedded waveguide in which the whole core is surrounded by the clad is considered, it is practically difficult to introduce heterogeneous waveguide intervals having different core materials, in an area of array waveguides because of the complicated process of forming waveguides.

Also, even after the introduction of heterogeneous waveguide intervals, there is a problem that optical coupling loss occurs additionally in the boundary part between existing waveguide intervals and the heterogeneous waveguide intervals. It is clarified that "existing wave guide intervals" means the waveguide intervals made of an "already established" material, which consist of a homogeneous material having uniform refractive index, and into which a new material is being introduced in the manufacturing process.

Figure 3:
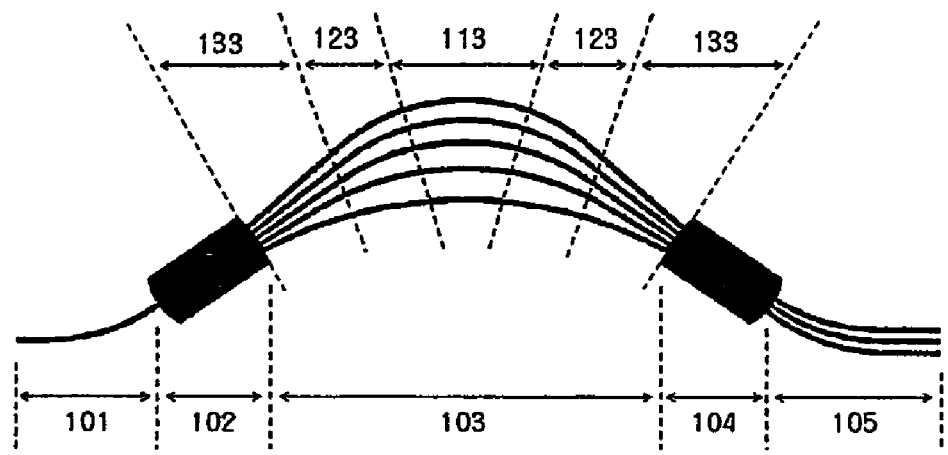
FIG. 3 is a diagram illustrating an optical filter module for wavelength multiplexing and demultiplexing in the form of an arrayed waveguide grating including heterogeneous waveguide intervals, according to an embodiment of the present invention.

FIG. 3 is a diagram illustrating an optical filter module for wavelength multiplexing and demultiplexing in the form of an arrayed waveguide grating including heterogeneous waveguide intervals, according to an embodiment of the present invention.

Figure 1:
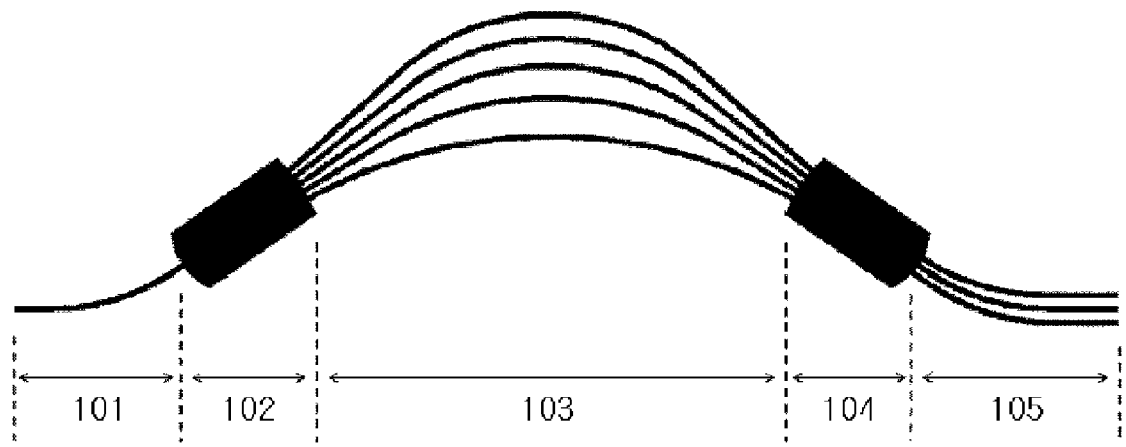
FIG. 1 is a diagram illustrating an example of a conventional optical filter module for wavelength multiplexing and demultiplexing in the form of an arrayed waveguide grating.

The operation and function of the optical filter module illustrated in FIG. 3 is similar to that illustrated in FIG. 1, except that the optical filter module illustrated in FIG. 3 has array waveguides 103. Therefore, description for overlapped part is omitted.

The heterogeneous waveguide intervals 113 in the optical filter module according to the current embodiment of the present invention are formed of core materials, each of which has a refractive index greater than or less than that of the cores of the array waveguides 103, in predetermined areas of the array waveguides 103 for the purpose of reducing polarized light and temperature dependency, at the same time or individually, of the optical filter module. When the heterogeneous waveguide intervals 113 are introduced, transitional waveguide intervals 123 for lossless conversion of a waveguide mode in the boundary parts between the heterogeneous waveguide intervals 113 and the existing (homogeneous) array waveguide intervals 133 can be formed naturally without an additional process of forming waveguides in the process of forming the heterogeneous waveguide intervals 113.

The present invention adopts a structure including two core materials in which a core material having a lower refractive index than that of the other core materials functions as a clad of the other core material and the width of the core with the greater refractive index gradually decreases in the direction of the opposite waveguide. In this way, lossless conversion of a waveguide mode is enabled. This will now be explained in detail with reference to FIGS. 4A and 4B.

Figure 4A:
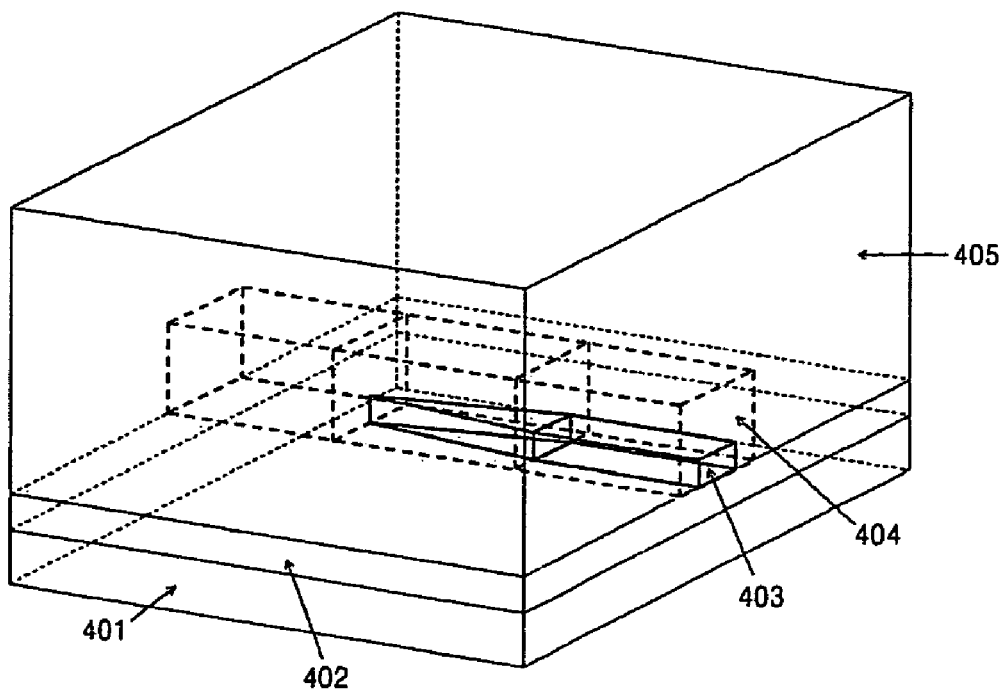
FIGS. 4A and 4B are diagrams illustrating transitional waveguide intervals of an optical filter module for wavelength multiplexing and demultiplexing in the form of an arrayed waveguide grating, according to an embodiment of the present invention.
Figure 4B:
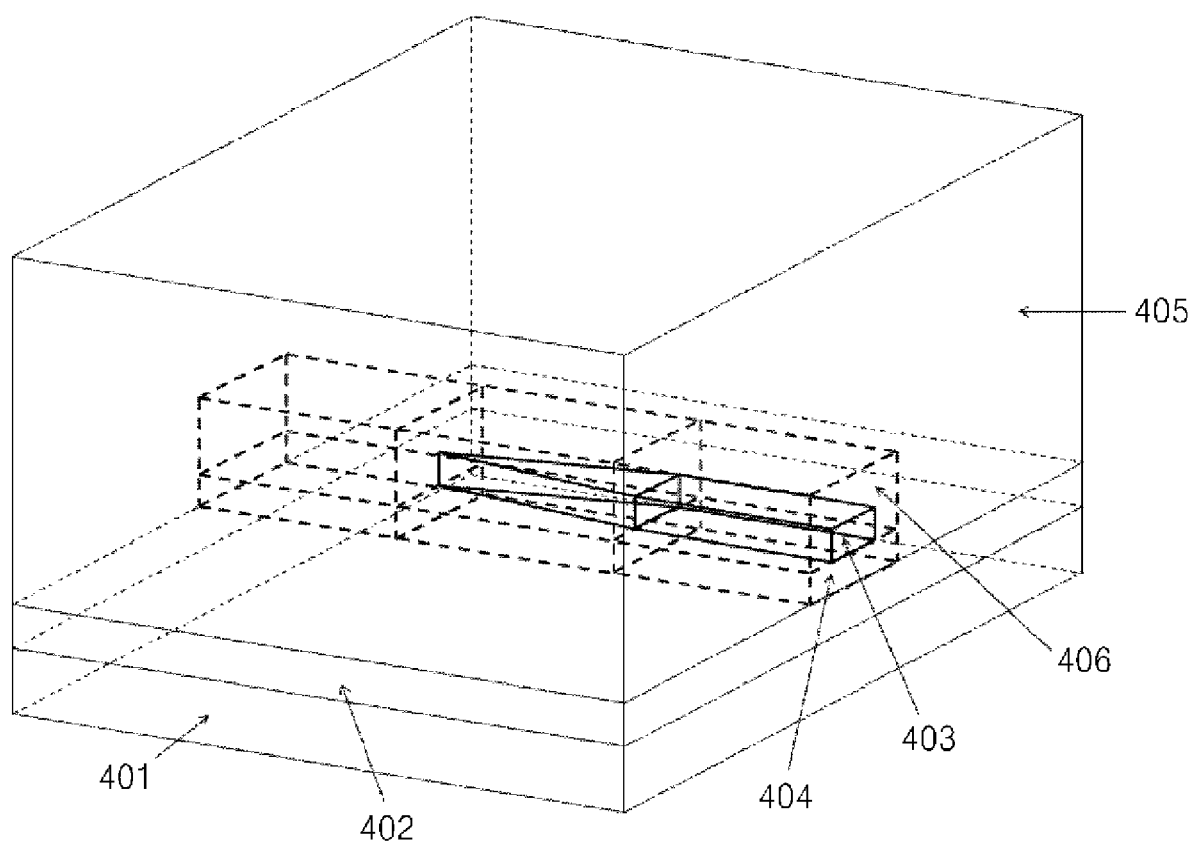

FIGS. 4A and 4B are diagrams illustrating transitional waveguide intervals of an optical filter module for wavelength multiplexing and demultiplexing in the form of an arrayed waveguide grating, according to an embodiment of the present invention.

FIGS. 4A and 4B illustrate transitional waveguide intervals implemented on a substrate 401 formed of a material such as silicon. On the top part of a lower clad film 402, a core film 404 having a relatively low refractive index and a core film 403 having a relatively large refractive index are sequentially formed, and then, the core film 403 having the relatively large refractive index is etched to a desired shape. Then, a core film 406 having a relatively low refractive index is formed on the resulting structure, and then, etched to a desired shape. Finally, an upper clad film 405 is vapor deposited on the resulting structure including the core film 406.

Thus, according to the present invention, heterogeneous waveguide intervals, in which characteristics of guided wave are different from each other, and transitional waveguide intervals for lossless conversion of a waveguide mode are formed in existing (homogeneous) array waveguides, and without an additional process of forming waveguides, the transitional waveguide intervals are naturally formed in a process of forming the heterogeneous waveguide intervals.

In a situation where a silicon core waveguide having a rectangular sectional shape is applied to array waveguides and causes significant polarized light dependency of a filter wavelength, the polarized light dependency of the filter wavelength can be reduced by applying a material such as a silicon nitride having a refractive index less than that of silicon, to the core of a square waveguide forming a heterogeneous waveguide interval.

In this case, the lengths of the optical paths of individual waveguides forming the existing (homogeneous) array waveguide are identical as in the transitional waveguide intervals. However, the waveguides forming the heterogeneous waveguide intervals should be designed to be sequentially arranged so that the optical path of each waveguide can have a predetermined interval having a difference from those of the others, thereby allowing a wavelength filter function to be performed.

Also, when the thermal optical coefficient of the waveguide core forming the heterogeneous waveguide intervals is greater or less than the thermal optical coefficient of the waveguide core forming the existing (homogeneous) array waveguide, the temperature dependency of a filter wavelength can be reduced by a temperature compensation design of an appropriate array waveguide.

In predetermined areas of existing (homogeneous) array waveguides 133 in which optical paths of waveguides (in which the effective refractive index of a basic mode is $n_1$, and a thermal optical coefficient which indicates the degree of change in this effective refractive index with respect to temperature T is defined as $dn_1/dT$) are sequentially arranged so that the difference between the optical paths of neighboring waveguides can be $\Delta L_1$, if heterogeneous waveguides 113 having a thermal optical coefficient of $dn_2/dT$ are sequentially arranged so that the difference between the optical paths of neighboring waveguides can be $\Delta L_2$, and an arrayed waveguide grating having a diffraction degree of m can be formed, the central wavelength $\lambda_0$ of the optical filter module in the form of arrayed waveguide grating can be expressed as equation 1 below in a situation where the effective refractive index $n_2$ of the heterogeneous waveguides is greater than the effective refractive index $n_1$ of the existing (homogeneous) waveguides:

$$n_1 \Delta L_1 - (n_2 - n_1) \Delta L_2 = m \lambda_0 \quad (1)$$

Also, in order to allow the central wavelength $\lambda_0$ of equation 1 to have a temperature-independent characteristic, the two types of the thermal optical coefficients and the optical paths described above should be designed to satisfy equation 2 below:

$$\Delta L_1 / \Delta L_2 = (dn_2/dT)/(dn_1/dT) - 1 \quad (2)$$

Meanwhile, when the effective refractive index $n_2$ of the heterogeneous waveguides is less than the effective refractive index $n_1$ of the existing (homogeneous) waveguides, equations 1 and 2 can be expressed as equations 3 and 4, respectively:

$$n_1 \Delta L_1 + (n_2 - n_1) \Delta L_2 = m \lambda_0 \quad (3)$$

$$\Delta L_1 / \Delta L_2 = 1 - (dn_2/dT)/(dn_1/dT) \quad (4)$$

Thus, according to the present invention, heterogeneous waveguide intervals formed with cores of materials having refractive indices greater or less than the refractive indices of the cores of existing (homogeneous) array waveguides, are introduced into the predetermined intervals of the existing (homogeneous) array waveguides, and the cores having the lower refractive index between the two types of cores described above is made to operate as the clad of the other waveguide, and the width of the other core having a relatively greater refractive index is formed to have a shape gradually decreasing in the direction to the opposite waveguide.

In this way, the present invention optimizes the design of the arrayed waveguide grating, thereby reducing the polarized light and temperature dependency of the optical filter module individually or simultaneously.

Also, in the process of forming the heterogeneous waveguide intervals, the transitional waveguide intervals for lossless conversion of a waveguide mode in the boundary part between the heterogeneous waveguide intervals and the existing (homogeneous) array waveguides are naturally formed without an additional process of forming waveguides.

Meanwhile, when the refractive index of the cores of the existing (homogeneous) array waveguides is much greater than that of the cores of the heterogeneous waveguide intervals, the present invention suppresses the increase in the light loss of the array waveguides themselves caused by the physical coarseness of the core side surface, and the increases in the phase error between individual waveguides.

In the optical filter module and method of manufacturing the same according to the present invention, heterogeneous waveguide intervals having core materials different from those of conventional waveguides are introduced in predetermined areas of array waveguides, thereby reducing polarized light and temperature dependency and at the same time effectively removing optical coupling loss, which can occur at both ends of a heterogeneous waveguide interval, without an additional process of forming waveguides.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An optical filter module for wavelength multiplexing and demultiplexing, said module comprising:
   at least one input waveguide;
   an input-stage star coupler in the form of a slab waveguide connected to said at least one input waveguide;
   an array waveguide which is connected to said input-stage star coupler and in which a plurality of individual waveguides, each of which has an optical path having a predetermined length different to those of the other waveguides of the array and has a homogeneous waveguide interval formed of a core material having a first refractive index and a heterogeneous waveguide interval formed of core materials having said first refractive index and a second refractive index that is greater or less than said first refractive index, are sequentially arranged;
   an output-stage star coupler in the form of a slab waveguide connected to said array waveguides; and
   at least one output waveguide connected to said output-stage star coupler,
   wherein, in the heterogeneous waveguide interval, a core having a lesser refractive index is a clad of a core having a greater refractive index, and the optical path lengths of individual waveguides are different from each other in said homogeneous waveguide interval and said heterogeneous waveguide interval, respectively.

2. The module of claim 1, wherein each individual waveguide of the array comprises a transitional waveguide interval formed of core materials having said first refractive index and said second refractive index, which is connected between said homogeneous waveguide interval and said heterogeneous waveguide interval, and in which the width of the core having said second refractive index gradually decreases in the direction from said heterogeneous waveguide interval to said homogeneous waveguide interval if said second refractive index is greater than said first refractive index, but if said first refractive index is greater than said second refractive index, the width of the core having said first refractive index gradually decreases in the direction from said homogeneous waveguide interval to said heterogeneous waveguide interval.

3. An array waveguide in which a plurality of individual waveguides, each of which has an optical path with a length different from those of the other waveguides of the array, are sequentially arranged,
   wherein each individual waveguide has a homogeneous waveguide interval formed of a core material having a first refractive index and a heterogeneous waveguide interval formed of core materials having said first refractive index and a second refractive index that is greater or less than said first refractive index, and in said heterogeneous waveguide interval, a core having a lesser refractive index is a clad of a core having a greater refractive index, and the optical path lengths of individual waveguides are different from each other in said homogeneous waveguide interval and said heterogeneous waveguide interval, respectively.

4. The array waveguides of claim 3, wherein each individual waveguide of the array comprises a transitional waveguide interval formed of core materials having said first refractive index and said second refractive index, which is connected between said homogeneous waveguide interval and said heterogeneous waveguide interval, and in which the width of the core having said second refractive index gradually decreases in the direction from said heterogeneous waveguide interval to said homogeneous waveguide interval if said second refractive index is greater than said first refractive index, but if the first refractive index is greater than the second refractive index, the width of the core having said first refractive index gradually decreases in the direction from said homogeneous waveguide interval to said heterogeneous waveguide interval.

5. A method of manufacturing an optical filter module for wavelength multiplexing and demultiplexing, said method comprising:
   forming at least one input waveguide;
   connecting an input-stage star coupler in the form of a slab waveguide to said at least one input waveguide;
   forming array waveguides, by sequentially arranging a plurality of individual waveguides each of which has an optical path having a predetermined length different from the other waveguides of the array and has a homogeneous waveguide interval formed of a core material having a first refractive index and a heterogeneous waveguide interval formed of core materials having said first refractive index and a second refractive index that is greater or less than said first refractive index, and connecting the array waveguides to said input-stage star coupler;

connecting an output-stage star coupler in the form of a slab waveguide to said array waveguides; and connecting at least output waveguide to said output-stage star coupler, wherein said heterogeneous waveguide interval comprises a core having a lesser refractive index as a clad of a core having a greater refractive index, and the optical path lengths of individual waveguides are different from each other in said homogeneous waveguide interval and said heterogeneous waveguide interval, respectively.

6. The method of claim 5, wherein the forming of said array waveguides and the connecting of said array waveguides to said input-stage star coupler comprises forming a transitional waveguide interval with core materials having said first refractive index and said second refractive index, in which the width of the core having said second refractive index gradually decreases in the direction from said heterogeneous waveguide interval to said homogeneous waveguide interval if said second refractive index is greater than said first refractive index, but if said first refractive index is greater than said second refractive index, the width of the core having said first refractive index gradually decreases in the direction from said homogeneous waveguide interval to said heterogeneous waveguide interval, and connecting said transitional waveguide interval between said homogeneous waveguide interval and said heterogeneous waveguide interval.

7. A method of manufacturing array waveguide in which a plurality of individual waveguides, each of which has an optical path with a length different from that of the other waveguides of the array and has a homogeneous waveguide interval, a heterogeneous waveguide interval and a transitional waveguide interval, are sequentially arranged, the method comprising:

forming said homogeneous waveguide interval with a core material having a first refractive index, in each individual waveguide;

forming said heterogeneous waveguide interval with core materials having said first refractive index and a second refractive index that is greater or less than said first refractive index, in each individual waveguide, and in the heterogeneous waveguide interval, forming a core material having a lesser refractive index as a clad of a core having a greater refractive index; and forming said transitional waveguide interval with core materials having said first refractive index and said second refractive index, in which the width of the core having said second refractive index gradually decreases in the direction from said heterogeneous waveguide interval to said homogeneous waveguide interval if said second refractive index is greater than said first refractive index, but if said first refractive index is greater than said second refractive index, the width of the core having said first refractive index gradually decreases in the direction from said homogeneous waveguide interval to said heterogeneous waveguide interval, and connecting said transitional waveguide interval between said homogeneous waveguide interval and said heterogeneous waveguide interval, wherein the optical path lengths of individual waveguides are different from each other in said homogeneous waveguide interval and said heterogeneous waveguide interval, respectively.

* * * * *